March 31, 1942.  H. L. BARTER ET AL  2,278,300
TOOL FOR CHAMFERING AND BURRING
Original Filed Oct. 11, 1935   3 Sheets-Sheet 1
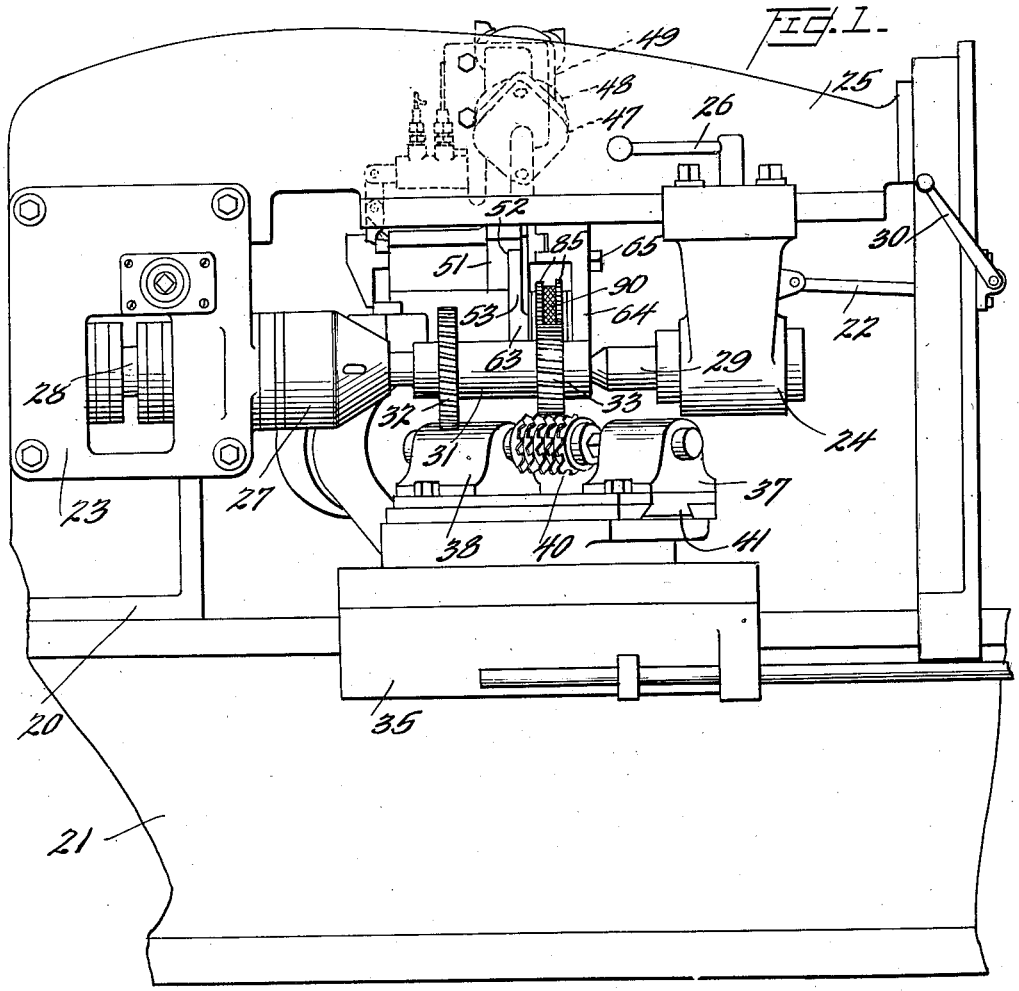
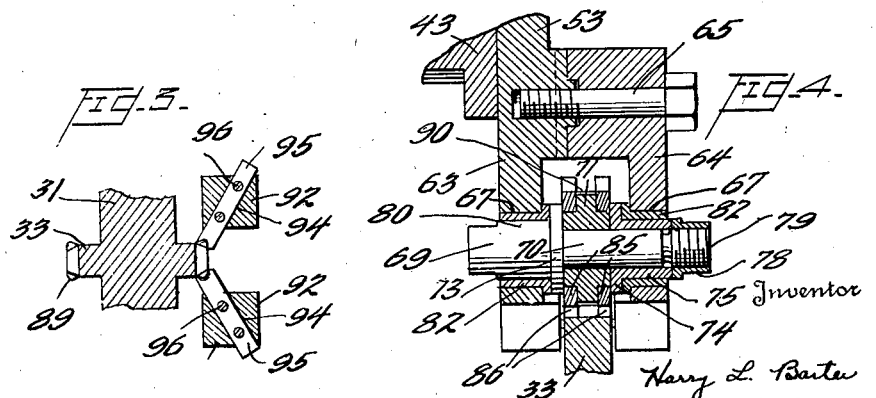
Inventor
Harry L. Barter
John M. Christman
By Watson, Cole, Grindle & Watson
Attorney

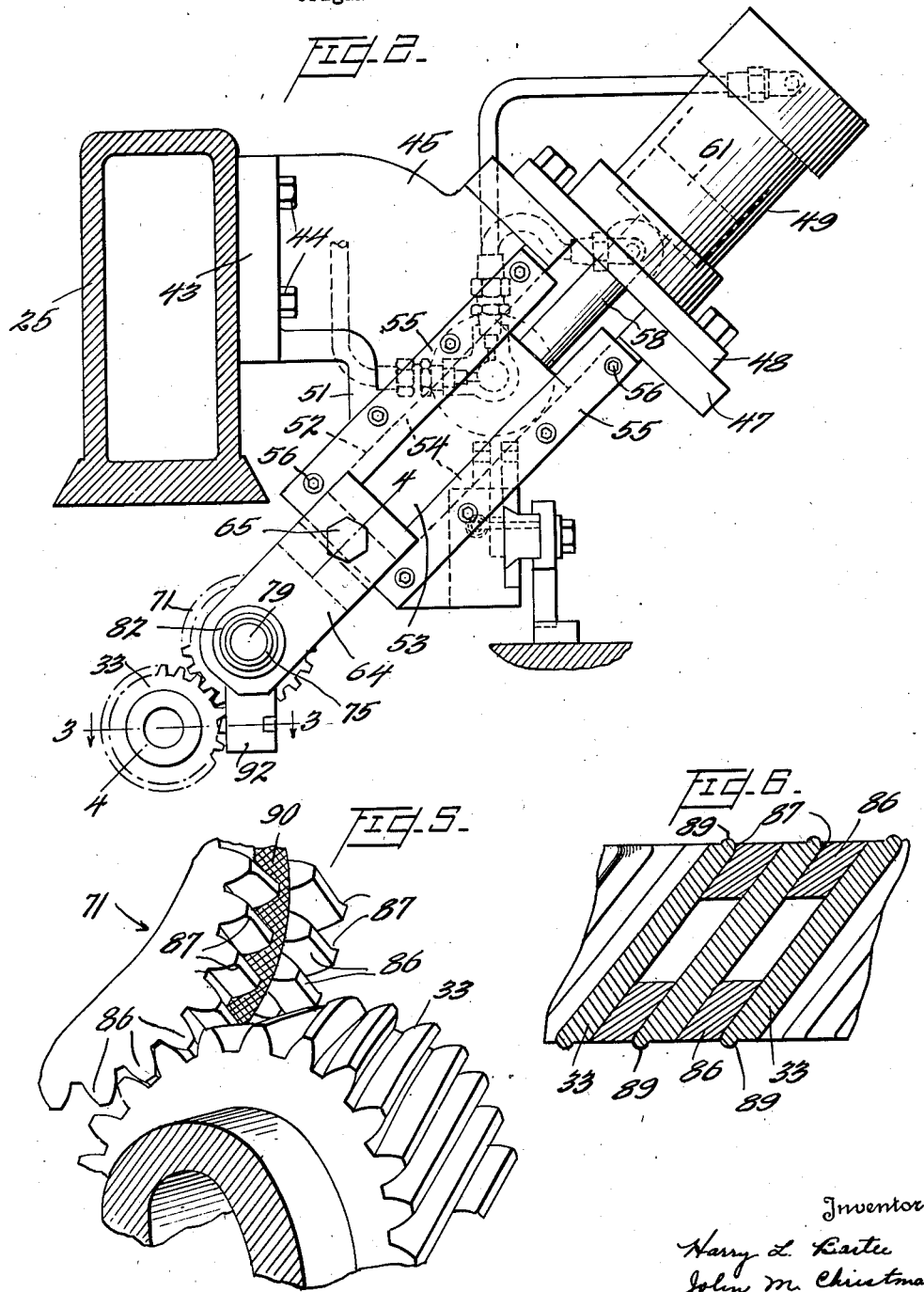

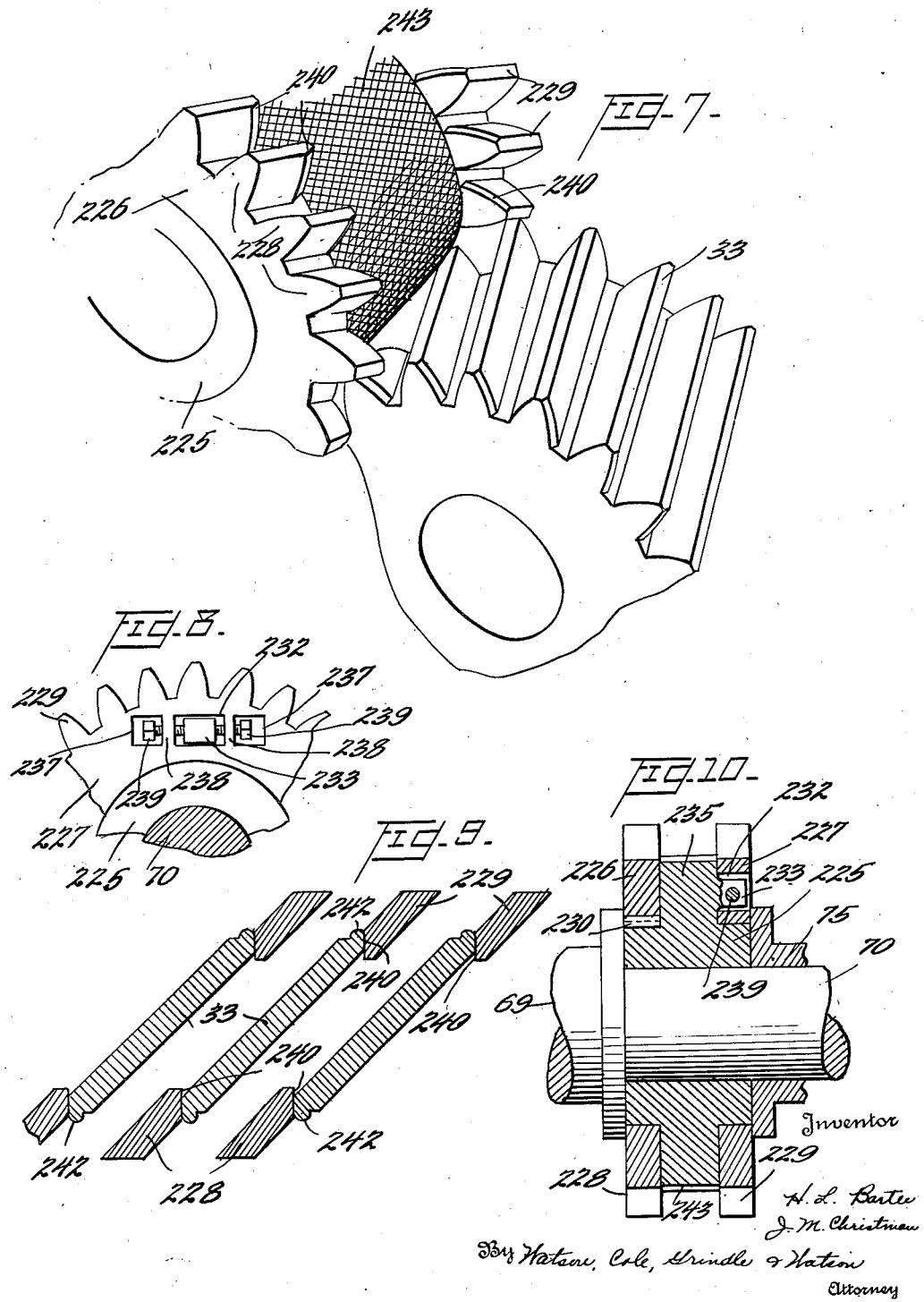

Patented Mar. 31, 1942

2,278,300

UNITED STATES PATENT OFFICE 2,278,300

TOOL FOR CHAMFERING AND BURRING

Harry L. Barter and John M. Christman, Detroit, Mich., assignors to Packard Motor Car Company, Detroit, Mich., a corporation of Michigan Original application October 11, 1935, Serial No. 44,629, now Patent No. 2,206,443, dated July 2, 1940. Divided and this application April 1, 1940, Serial No. 327,328

8 Claims. (Cl. 90—1.4)

This invention relates to a gear forming and finishing tool and has for its object the provision of a tool of this character which will rapidly and efficiently chamfer the edges of gear teeth or remove the burrs at the intersection of the working surfaces of the teeth and the end faces thereof and at the outer ends of the teeth. This application is a division of our prior application, Serial No. 44,629, filed October 11, 1935, Patent 2,206,443, July 2, 1940.

The chamfering of gears, commonly done by hand by means of a file, not only serves to prevent the breaking off during use of the gears of small particles of metal, which is obviously highly objectionable in the event the gears are used in an automobile transmission or other closed lubricated housing, but in the case of gears which are axially shiftable into and out of mesh, such as starter gears or gears employed in change speed transmissions, the meshing of the gears is facilitated by the provision of cooperating chamfered or beveled edges.

It has been heretofore proposed to provide machines for effecting the chamfering of gears to replace the hand chamfering commonly employed, but these machines rely for the most part on a cutting operation which is difficult to execute with accuracy and which is likely to leave burrs or rough edges on the teeth which are equally as objectionable as the original burrs on the freshly cut gear teeth. The present invention eliminates these difficulties by providing a tool which may be used to effect chamfering of the teeth by deformation of each tooth by the application of pressure thereto before the gear is hardened. If desired, the material displaced as the result of such deformation may be removed by grinding or cutting, but under some circumstances this step may be eliminated.

In a more specific aspect thereof, the invention contemplates the provision of a hardened toothed element which may be rolled with an unhardened gear, the latter having the lateral end portions of the working faces of the teeth thereof deformed, whereby corresponding deformation of the end portions of the teeth of the unhardened gear may be effected to provide the desired chamfer. Cutting means may be associated with the hardened element and disposed adjacent the chamfered ends of the teeth for removing excess metal as it is displaced from the body of the tooth.

A further object is to provide a tool having axially spaced toothed portions for engagement with the lateral end portions of the working faces of the teeth of a gear to deform the latter, the tool having an intermediate portion adapted to engage with the outer circumference of the gear teeth to exert thereon a scrubbing or grinding action, whereby burrs may be removed. The invention contemplates either the separate or the combined employment of the various features outlined herein in a tool for treating and finishing gears, clutches, or like toothed elements.

The tool claimed herein may be manually applied to a gear to be chamfered, or may be used in conjunction with any suitable supporting or operating means. We prefer, however, to employ the tool in a machine of the type shown and claimed in our prior application aforesaid, and such a machine is partially represented and described herein.

Thus it is proposed in our prior application to render the chamfering and burr removing operation partly or wholly automatic, the machine for effecting the chamfering being controlled by a tooth forming or cutting apparatus. A gear hobbing machine of more or less conventional design is employed, the hob being fed into the gear blank to form the teeth thereon, and the chamfering machine is responsive to the feeding movement of the hob, whereby the chamfering operation is definitely timed and requires no attention on the part of the operator once the machine has been adjusted to perform the necessary operations. It is thus possible to initiate and to terminate the chamfering and burr removing operation at predetermined instants so as to eliminate the human factor and thereby to produce gears of increased uniformity. Furthermore, the timing of the gear chamfering machine may be such that the chamfering operation will overlap to some extent the tooth cutting operation so that the total amount of time required for the production of a gear is reduced. Such overlapping of these operations would obviously be difficult to effect if the operator were relied upon to determine the precise instant at which the chamfering operation should begin. It will nevertheless be appreciated that the tool described and claimed herein is not limited to use in such a machine.

Further objects and features of the invention will be apparent from the following description taken in connection with the accompanying drawings, in which Figure 1 is a front elevation of a complete forming and finishing machine of the character disclosed in our prior application, and employing a tool of the type described and claimed herein;

Figure 2 is a side elevation of part of the structure shown in Figure 1;

Figure 3 is a sectional view taken substantially on the line 3—3 of Figure 2;

Figure 4 is a partial section on the line 4—4 of Figure 2;

Figure 5 is a perspective view illustrating the manner in which the chamfering element and unhardened gear cooperate;

Figure 6 is a sectional view through the intermeshing teeth of the element and gear of Figure 5;

Figure 7 is a perspective view corresponding to Figure 5 and illustrating a slightly modified form of the invention;

Figure 8 is a fragmentary view in end elevation of the chamfering element shown in Figure 7;

Figure 9 is a sectional view corresponding to that shown in Figure 6 but illustrating the mode of cooperation of the modified form of chamfering element and unhardened gear shown in Figure 7; and Figure 10 is a sectional view through the axis of the chamfering element shown in Figure 7.

For convenience in describing the invention, reference is made to the several embodiments thereof illustrated in the accompanying drawings and specific language is employed. It will nevertheless be understood that no limitation of the scope of the invention is thereby intended, but that various further modifications and alterations are contemplated such as would occur to one skilled in the art to which the invention relates.

Referring first to Figure 1 of the drawings which discloses the principal elements of the gear forming and chamfering machine illustrated and claimed in our aforesaid prior application, it will be observed that the bed of the machine, indicated generally at 20, is supported on a base 21 and is provided with a head stock 23 and a tail stock 24, the latter being carried on an upper support or over-arm 25 for displacement toward and from the head stock by means of a link 22 and crank handle 30, the tail stock being locked in position by manipulation of a lever 26. A work holder or chuck 27 associated with the head stock 23 and rotated by a shaft 28 cooperates with a spindle 29 of the tail stock to support a gear blank for rotation on the axis thereof. The completed work is represented in Figure 1 as constituting a gear cluster for use in an automobile transmission, the gear cluster comprising a sleeve 31 on which are formed gears 32 and 33, the formation and chamfering of the latter gear being illustrated.

The bed 20 of the machine supports a conventional reciprocating carriage 35 on which is mounted a tool support including bearing blocks 37 and 38 in which may be rotatably mounted a cutting tool such as a hob 40, suitable means being provided for rotating the hob, the tool support and the carriage 35 being provided with cooperating guide means 41 whereby the hob may be properly positioned initially on the carriage.

The hobbing operation may be performed in the conventional manner by displacement of the carriage 35 on the bed 20 from right to left as viewed in Figure 1 whereby the hob 40 may be fed into and may traverse the portion of the gear blank on which the gear 33 is to be formed, the blank being rotated in timed relation to the reciprocating movement of the carriage and hob and the rotational speed of the hob. The details of the construction thus far described form no part of the present invention.

The apparatus for finishing the gear teeth by chamfering the ends thereof and removing burrs therefrom as illustrated in Figures 2 and 4 is carried by the over-arm 25 of the machine, for instance by means of a supporting bracket 43 having an arm 45 which is bolted as at 44 to the over-arm. Bracket 43 may be provided at its upper end with a flanged portion 47 to which is secured the supporting flange 48 of a cylinder 49. The bracket 43 may also be provided with a downwardly and forwardly projecting portion 51 which is recessed as at 52 to form rectilinear guides which receive a reciprocating member 53, the cooperating guide portions 54 of the reciprocating member being retained in position by means of guide plates 55 which are secured to the guide portion 51 of the bracket 43 as indicated at 56. At its upper end the member 53 is secured to a piston rod 58, the piston rod extending into the lower end of the cylinder 49 and being connected therein to a piston 61 which may reciprocate in the cylinder in the conventional manner. At its lower end the member 53 is formed to provide one arm 63 of a tool support yoke, the other arm 64 of the yoke being secured to the member 53 by means of a bolt 65 extending therethrough.

The yoke arms 63 and 64 are apertured as indicated at 67 to receive a stud 69, the stud 69 having a generally cylindrical portion 70 which is adapted to receive a chamfering tool 71 which may be shrunk in position on the stud, the tool 71 engaging at one side an annular flange 73 formed on the stud, and at the other side the flange portion 74 of a collar 75 which is received on the stud and retained in position therein by means of a nut 78 threaded on the end portion 79 of the stud. The stud 69 is further provided adjacent the opposite end thereof with an enlarged cylindrical portion 80, and the portion 80 of the stud and the collar 75 are mounted for free rotation in the aligned apertures 67 of the arms 63 and 64, bushings 82 being preferably employed.

It will be appreciated that the foregoing descriptive matter is merely illustrative of one method of using the tool described and claimed herein, and that the details of the structure thus far described form no part of the instant invention.

The tool 71 may be formed in one piece but is preferably constructed to afford a hub portion on the opposite ends of which are shrunk the hardened annular elements 85. The peripheral portions of the elements 85 are formed with teeth 86 which are constructed for meshing engagement with the teeth of the gear 33 which is being formed and finished.

The teeth 86 are preferably deformed to provide generally radial protuberances 87, as illustrated more particularly in Figures 5 and 6, so as to supply pressure to the opposed portions of the working faces of the teeth of the relatively soft gear 33 to deform the latter when the gear and tool are rolled together in meshing relation. The teeth of the gear 33 are thereby deformed so that the edge or arris formed by the intersection of the working faces and the lateral ends of the gear teeth is more or less flattened. Thus these gear tooth ends are in effect chamfered, the material of which the gear teeth are formed being displaced laterally or swaged over with the resultant formation of projections 89 at the lateral ends of the gear teeth.

The protuberances 87 on the teeth of the tool 71 are preferably formed by curving the working faces of the tool teeth, whereby the circumferential end edges of the opposed teeth of the gear 33 are rounded. Nevertheless the operation on the gear teeth is essentially one of flattening the end edges, it being appreciated that the rounded contour of the lateral ends of the gear teeth upon completion of the operation is substantially flatter than is the initial sharply angled edge or arris formed by the cutting of the teeth in the blank. Obviously the protuberances 87 may be of different shape from that shown in the drawing, the relatively soft teeth of the gear 33 being swaged to the corresponding shape when the gear and tool are rolled together.

The hub portion of the tool 71 is illustrated as provided with an annular flange 90 disposed intermediate the annular toothed elements 85, and the peripheral portion of this flange may be roughened or knurled, the flange being of sufficient diameter to engage the central portions of the outer ends of the teeth when the tool is rolled with the gear 33. It will be observed that by reason of the difference between the diameter of the knurled portion and the effective diameters of the annular toothed elements 85 as determined by the pitch circles thereof, the knurled portion of the tool will have less linear speed than the outer ends of the teeth of the gear 33 with which it engages, and thus a scrubbing or grinding action will result to effect removal from the outer ends of the gear teeth of any rough edges or burrs which may be formed by the action of the hob 40. The removal of these burrs, both on the outer ends and on the end edges of the teeth is extremely important, it being essential, particularly in the processing of gears for use in closed lubrication systems such as are employed in the change speed gearing of automobiles, that the breaking off of fragments of the teeth and the wearing away of any burrs formed during cutting be avoided. It will also be observed that the knurled portion of the tool by engagement with the ends of the gear teeth limits the movement into the gear of the tool and thereby the extent to which the annular toothed elements 85 act in chamfering the gear teeth.

Under some circumstances it may be desired to provide chamfering teeth 86 at one side only of the tool 71 and in the event a gear having twisted or helical teeth is being formed and finished, the teeth 86 will ordinarily be arranged so as to effect chamfering of those end edges of the teeth which are more acutely angled since such edges are more likely to be formed with an initial burr by the cutting of the teeth and are much more subject to fracture in operation than are the obtuse angled edges.

It will further be appreciated that where grinding or scrubbing of the outer circumference of the teeth is not desired, and the roughened central portion of the tool may thus be dispensed with, the teeth of the tool may extend continuously from one side face thereof to the other, either one or both ends of these teeth being deformed to effect corresponding deformation of the gear undergoing treatment.

In a swaging or chamfering operation such as that hereinbefore described, it is frequently desirable to remove the material displaced laterally of the teeth and forming the projections 89, particularly since these projections constitute burrs in themselves which are likely to chip off and act as an abrasive, resulting in excessive wear of the cooperating working surfaces of the teeth in an assembled gear train. This excess metal is preferably removed by a cutting operation, and for this purpose the yoke arms 63 and 64 may be provided with downwardly extending projections 92 which may be formed separately from the yoke arms and secured thereto by welding. Each of the projections 92 is slotted as indicated at 94 to receive a cutting tool 95, these cutting tools being adjustable toward or away from each other within the respective recesses 94 and being retained in position by means of set screws 96 or the like. As shown more particularly in Figure 3 of the drawings, the working ends of the tools are arranged to simultaneously engage the opposite ends of each tooth of the gear 33 as the latter rotates, one of the cutting tools 95 being preferably disposed at a slightly lower point than the other tool in the event the teeth of the gear 33 are helical or twisted, endwise pressure on the gear being thus balanced by the simultaneously applied and oppositely directed pressure exerted by the cutting tools on the opposite ends of each gear tooth.

By suitable means, for example that disclosed in our prior application aforesaid, air under pressure is admitted to the upper end of the cylinder 49 and the piston 61 moves downwardly to engage the chamfering tool 71 and the cutting tools 95 with the gear 33, pressure being applied to a sufficient extent to ensure proper meshing engagement of the tool teeth 86 with the teeth of the gear 33. The tool 71 is accordingly rolled on and by the gear 33 and the chamfering and burring action hereinbefore described is effected. While this operation is being performed, the tool support and the hob 40 carried thereby continue their movement. Ultimately the upper end of the cylinder is evacuated and the member 53 and the chamfering and cutting tools carried thereby are accordingly withdrawn from engagement with the gear 33 into the inoperative position.

The operation of forming and finishing the gear 33 is now completed, the gear may be removed from the machine, and the carriage 35, the tool support, and the hob 40 may be displaced toward the right as viewed in Figure 1 in readiness for operation on another gear. Suitable gearing, illustrated in our prior application, may be provided to establish the proper timed relation between the rotational movement of the hob on its own axis, the translational movement of the hob, and the rotational movement of the gear 33 during the hobbing operation.

Figures 7 to 10 inclusive illustrate a modified form of tool which is in some respects an improvement on that heretofore described although functioning in a generally similar manner. As shown more particularly in Figure 10 the tool may be mounted on the cylindrical portion 70 of the stud 69 and is retained in position thereon by the collar 75 as in the construction heretofore described. The hub portion 225 of the tool receives hardened annular elements 226 and 227 which are provided with toothed peripheral portions as indicated at 228 and 229. One of the annular elements, for instance the element 226, is secured on the hub 225 of the tool against rotation with respect thereto, for instance by means of a key 230. The other annular element 227 is supported on the hub 225 for rotative adjustment with respect thereto. The means for effecting this adjustment may assume various forms and the details thereof form no essential part of the present invention.

For example, the element 227 may be apertured as indicated at 232 and an axially directed lug 233 formed on the radially extending portion 235 of the hub 225 may extend outwardly into the aperture 232. The element 227 may be further recessed as indicated at 237 at points on each side of and spaced from the aperture 232, leaving the axially directed ribs 238 which are threaded to receive bolts 239, the heads of these bolts lying within the recesses 237 and being accessible with a tool, and the ends of the bolts engaging the lug 233. It is apparent that by adjustment of the bolts 239, the annular element 227 may be rotatively or angularly adjusted on the hub 225 of the tool and securely retained in any desired position of adjustment.

The teeth formed on the peripheral portions 228 and 229 of the annular elements are arranged to engage with the ends of the teeth of the gear 33, but are not constructed for meshing engagement with the latter, the nature of the engagement being illustrated more particularly in Figure 9. Thus each of the tool teeth are bevelled or chamfered as indicated at 240 so as to engage and apply generally circumferential pressure to the opposite ends of the teeth of the gear 33 as the tool and the gear are rotated together in operative relation, and the acute angled portions at the ends of the gear teeth are deformed and flattened, metal being displaced laterally with resultant formation of projections 242 at the ends of the gear teeth which may be removed by cutting elements such as shown more particularly in Figure 3. In general the working surfaces 240 of the tool teeth are substantially flat and define planes approximately normal to the pitch circles of the toothed portions. The thickness of the teeth of the toothed portions is substantially less than the spaces between adjacent gear teeth so that the desired adjustment can be effected without difficulty.

It will be observed that the extent to which deformation or flattening of the gear teeth ends is carried out may be varied in this form of the invention by relative rotative adjustment of the annular elements 227 and 226 and the shape of the finished gear teeth may thereby be controlled in accordance with the purpose for which the gear is to be subsequently used. It will of course be understood that the radially extending portion 235 of the tool hub may be knurled as indicated at 243, this knurled portion serving to remove any burrs from the outer ends of the teeth of the gear 33 and to limit the extent to which the tool is moved toward and into operative engagement with the gear. It is apparent that with this form of construction careful cutting of the toothed portions of the tool to establish proper meshing relation with the gear is unnecessary and the expense of producing the tool may be correspondingly reduced. Furthermore, as wear occurs the two toothed elements of the tool may be relatively adjusted to the extent necessary to ensure correct chamfering of the gear teeth.

Having thus described the invention, what is claimed as new and desired to be secured by Letters Patent is:

1. As an article of manufacture, an element for effecting deformation and flattening of the lateral and edges of the teeth of an unhardened gear, said element having toothed portions at each lateral end thereof constructed for meshing relation with said gear, the working faces of the teeth of said element being formed to apply pressure to the gear teeth in a direction generally normal to the working faces of the latter when the element is rolled with the gear, said element having a roughened portion intermediate said toothed portions for engagement with the outer circumferential ends of the teeth of the latter.

2. As an article of manufacture, an element for effecting deformation and flattening of the lateral end edges of the teeth of an unhardened toothed gear, said element having axially spaced toothed portions for rolling engagement with the laterally opposite ends of the gear teeth, and means for effecting relative angular adjustment of said toothed portions to vary the extent of deformation of the gear tooth end edges.

3. As an article of manufacture, an element for effecting deformation and flattening of the lateral end edges of the teeth of an unhardened gear, said element having toothed portions at each lateral end thereof constructed for meshing relation with said gear, the working faces of the teeth of said element being formed to apply pressure to the gear teeth in a direction generally normal to the working faces of the latter when the element is rolled with the gear, said element having a roughened portion intermediate said toothed portions for engagement with the outer circumferential ends of the teeth of the latter, said roughened portion being generally cylindrical and of less diameter than the pitch circles of the said toothed portions.

4. As an article of manufacture, an element for effecting deformation and flattening of the lateral end edges of the teeth of an unhardened toothed gear, said element having axially spaced toothed portions for rolling engagement with the laterally opposite ends of the gear teeth, the teeth of said toothed portions having generally flattened working surfaces defining planes approximately normal to the pitch circles of the said toothed portions.

5. As an article of manufacture, an element for effecting deformation and flattening of the lateral end edges of the teeth of an unhardened toothed gear, said element having axially spaced toothed portions for rolling engagement with the laterally opposite ends of the gear teeth, the teeth comprising said toothed portions being of less thickness than the spaces intermediate the teeth of the unhardened gear, said toothed portions being disposed in such angular relation as to simultaneously engage gear teeth edges formed by the intersection of opposite working faces with opposite side faces of the gear, and to apply the pressure thereto necessary to produce deformation to the desired extent.

6. As an article of manufacture, an element for effecting deformation and flattening of the end edges of the teeth of an unhardened toothed member, said element having a hub portion, and having axially spaced toothed portions for rolling engagement with the opposite ends of the teeth of said member, said toothed portions being formed to apply pressure to the teeth of said member in a direction generally normal to the working faces of the latter when the element is rolled with the member.

7. As an article of manufacture, an element for effecting deformation and flattening of the end edges of the teeth of an unhardened toothed member, said element having a hub portion, and having axially spaced toothed portions for rolling engagement with the opposite ends of the teeth of said member, said toothed portions being formed to apply pressure to the teeth of said member in a direction generally normal to the working faces of the latter when the element is rolled with the member, said toothed portions being shrunk on said hub portion.

8. As an article of manufacture, an element for effecting removal of burrs from the outer circumferential ends of the teeth of an unhardened toothed member, said element having a generally cylindrical roughened surface for engagement with the tooth ends, and having a toothed portion dimensioned for rotative meshing engagement with said toothed member, the relative diameters of said roughened surface and said toothed portion being such that the said roughened surface is rotated at a linear speed slightly different from the linear speed of the tooth ends of the member.

HARRY L. BARTER.
JOHN M. CHRISTMAN.